Nov. 15, 1955 H. P. LUHN 2,723,801

ELECTRO-MECHANICAL DECIMAL ADDER

Filed Dec. 12, 1952 6 Sheets-Sheet 1

| DECIMAL VALUE | MAGNETS 35 4' | 4 | 2 | 1 |
|---|---|---|---|---|
| 0 | | | | |
| 1 | | | | X |
| 2 | | | X | |
| 3 | | | X | X |
| 4 | X | | | |
| 5 | X | | | X |
| 6 | X | | X | |
| 7 | X | | X | X |
| 8 | X | X | | |
| 9 | X | X | | X |

INVENTOR
HANS P. LUHN

BY Harry T. Berriman
AGENT

INVENTOR
HANS P. LUHN
BY Harry T. Berriman
AGENT

ELECTRO-MECHANICAL DECIMAL ADDER

INVENTOR
HANS P. LUHN
BY Harry T. Berriman
AGENT

Nov. 15, 1955 H. P. LUHN 2,723,801

ELECTRO-MECHANICAL DECIMAL ADDER

Filed Dec. 12, 1952 6 Sheets-Sheet 4

INVENTOR
HANS P. LUHN
BY
Harry T. Berriman
AGENT

Nov. 15, 1955 H. P. LUHN 2,723,801

ELECTRO-MECHANICAL DECIMAL ADDER

Filed Dec. 12, 1952 6 Sheets-Sheet 5

INVENTOR
HANS P. LUHN
BY Harry T. Berriman
AGENT

Nov. 15, 1955 H. P. LUHN 2,723,801

ELECTRO-MECHANICAL DECIMAL ADDER

Filed Dec. 12, 1952 6 Sheets-Sheet 6

INVENTOR
HANS P. LUHN
BY Harry T. Berriman
AGENT

United States Patent Office 2,723,801

Patented Nov. 15, 1955

2,723,801

ELECTRO-MECHANICAL DECIMAL ADDER

Hans P. Luhn, Armonk, N. Y., assignor to International Business Machines Corporation, New York, N. Y., a corporation of New York

Application December 12, 1952, Serial No. 325,594

12 Claims. (Cl. 235—61)

This invention relates to accumulating machines and more particularly to decimal accumulating machines utilizing electro mechanical accumulating devices.

In some cyclically operable accumulating machines which operate in response to the sensing of perforations in record cards, there is provided a multi-position counting wheel for each numeric order. Each counting wheel is normally disconnected from a counter advancing means which is synchronized with the movement of index points of a record card past a sensing station. Each record card is usually provided with parallel columns of uniformly spaced index points numbered 0 to 9, a particular number being represented in the record by a perforation in the corresponding index point of the desired column. The record is advanced 9's point first through the sense station and upon a sensing of a perforation at any one of the index points of a column, the associated counting wheel is connected with the counter advancing means. The counting wheel remains connected to the counter advancing means until the 0 index point of the record moves past the sensing station. In this manner each counting wheel is displaced angularly through a variable number of angular increments in accordance with the numeric value of the related sensed perforation. If a counter wheel is advanced from its 9 position to or through its 0 position during the so-called entry portion of the machine cycle, the next higher order counting wheel is reconnected to the counter advancing means, during a later part of the cycle, in order to advance that wheel one increment or position thus effecting a carry.

It will be appreciated that in the above described accumulating device, the lower limit of the duration of the add cycle is fixed by the time it takes to advance the add wheel through an angle to represent the entry of a nine, the largest digit.

By providing an electro-mechanical accumulating device which is capable of entering any one of the digits 1 to 9 in an identical time interval, an accumulator having a very fast add cycle is obtained. This accumulating device may comprise four rotary switching mechanisms for each numeric order to be accumulated. Each switch is adapted to be advanced a single step by a ratchet-pawl arrangement upon each energization of a related control magnet. Each switch of the device is assigned a distinctive weighted value in accordance with a four element binary code, the elements being designated 4, 4′, 2 and 1. The switch points of the four switches of each add device or counter unit are electrically connected in such a manner that a labyrinth circuit having a common input line and ten separate output lines is obtained, each output line designating one of the digits 0 to 9. After each counter entry cycle, a circuit is available through the labyrinth circuit to the output line representative of the new total in the counter.

The record cards utilized are perforated in the conventional decimal manner, there being ten numerical index points for each column of the record. Simultaneous sensing of all the index points in the column is effected by simultaneously moving individual sensing members against the related index points in each column of the record, the record being stationary at that time. Electrically arranged between the ten sensing instrumentalities for each column and the control magnets for the related add device, is a network for translating from the 0 to 9 decimal arrangement to the 4, 4′, 2, 1 code. Thus, the sensing of a "9" perforation effects the simultaneous energization of the control magnets 4, 4′ and 1 of the related counter unit. Sensing of perforations at other index points effects the energization of the required control magnets in a similar manner.

Associated with each of the control magnets of a counter unit are conventional transfer contact points which are also arranged in a labyrinth circuit. After each counter entry cycle, this latter labyrinth circuit represents the addend. By electrically comparing the addend to the new total represented in the counter unit itself, it is possible to determine in a unique manner if a carry should be made to the next higher order counter unit. By a novel mechanical-electrical arrangement, a carry operation from each counter unit to the next higher order counter is effected, when required, without appreciably lengthening the add cycle.

An object of the invention is to provide an electro-mechanical decimal counter unit that is fast in operation.

Another object of the invention is to provide an electro-mechanical decimal counter unit wherein the time required to enter a digit therein is the same for each decimal digit regardless of its numeric value.

Another object of the invention is to provide an electro-mechanical decimal counter unit having novel means for the determination of a carry.

Another object of the invention is to provide an electro-mechanical decimal counter unit wherein a carry operation is effected, when required, without appreciable lengthening the add cycle.

Yet another object of the invention is to provide an electro-mechanical decimal counter unit having a plurality of rotary switching or selector mechanisms electrically and mechanically interconnected in such a way to enable any decimal digit to be entered therein by a simultaneous single step advance of the switches, singularly or in combination, in accordance with a predetermined code.

Other objects of the invention will be pointed out in following description and claims and illustrated in the accompanying drawings, which disclose, by way of example, the principle of the invention and the best mode, which has been contemplated, of applying that principle.

In the drawings:

Fig. 1 is a front elevation view of the units order counter unit of a three order accumulator assembly, identical tens and hundreds order counters being positioned successively behind the one shown but hidden from view.

Fig. 2 is a vertical section view taken on the plane of the line 2—2 of Fig. 1, the left hand portion of Fig. 2 being taken through only the hundreds order counter unit of the three unit assembly, the mid portion of Fig. 2 being taken through only the tens order counter unit, and the right hand portion of Fig. 2 being taken through only the units order counter unit of the three unit assembly. In the view of hundreds order counter, the stepping mechanism for one of the rotator switching mechanisms associated therewith is shown in a nonoperative position. In the view of the tens order counter, the corresponding mechanism is shown in an operative position.

Figure 8A:
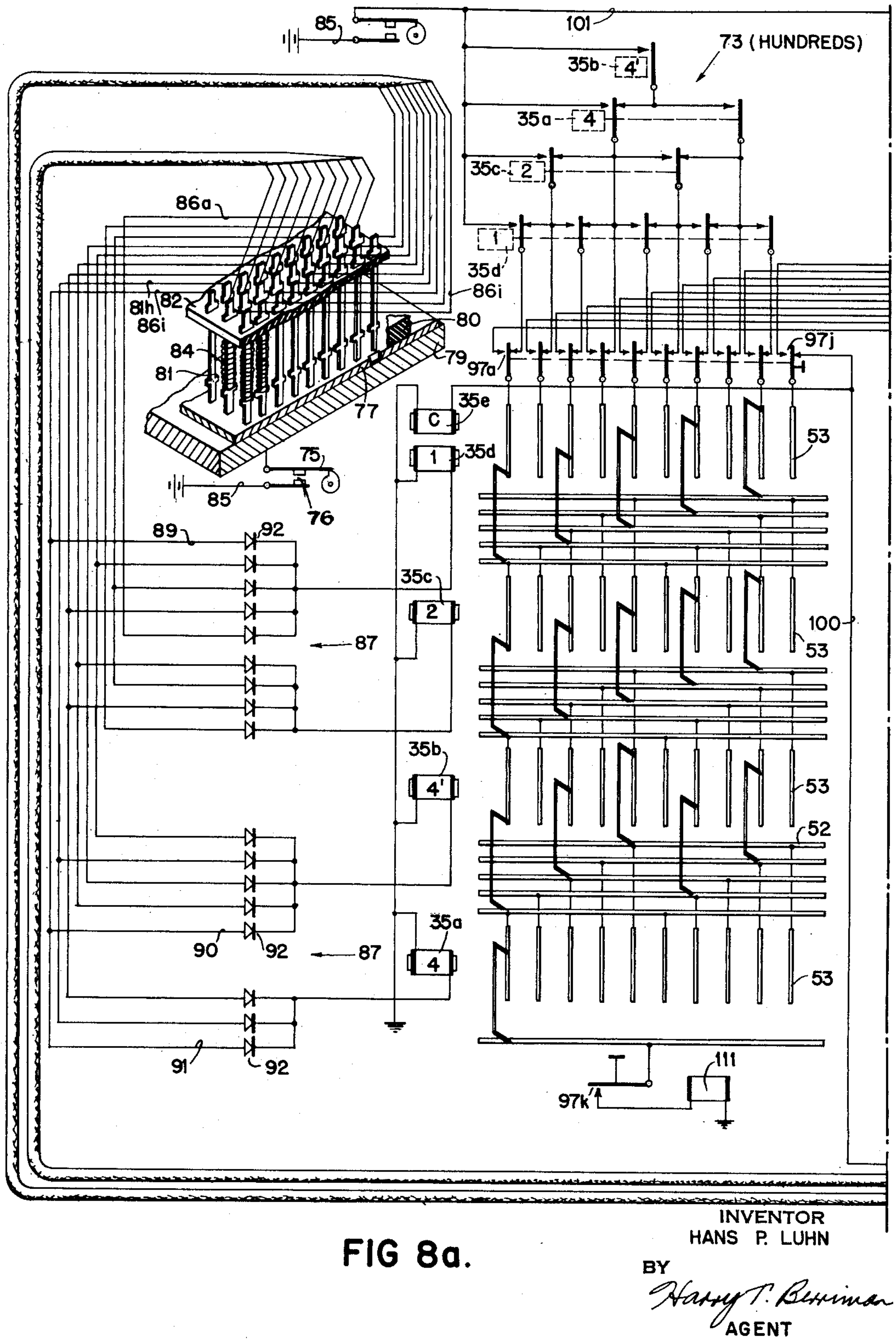
Figure 8B:
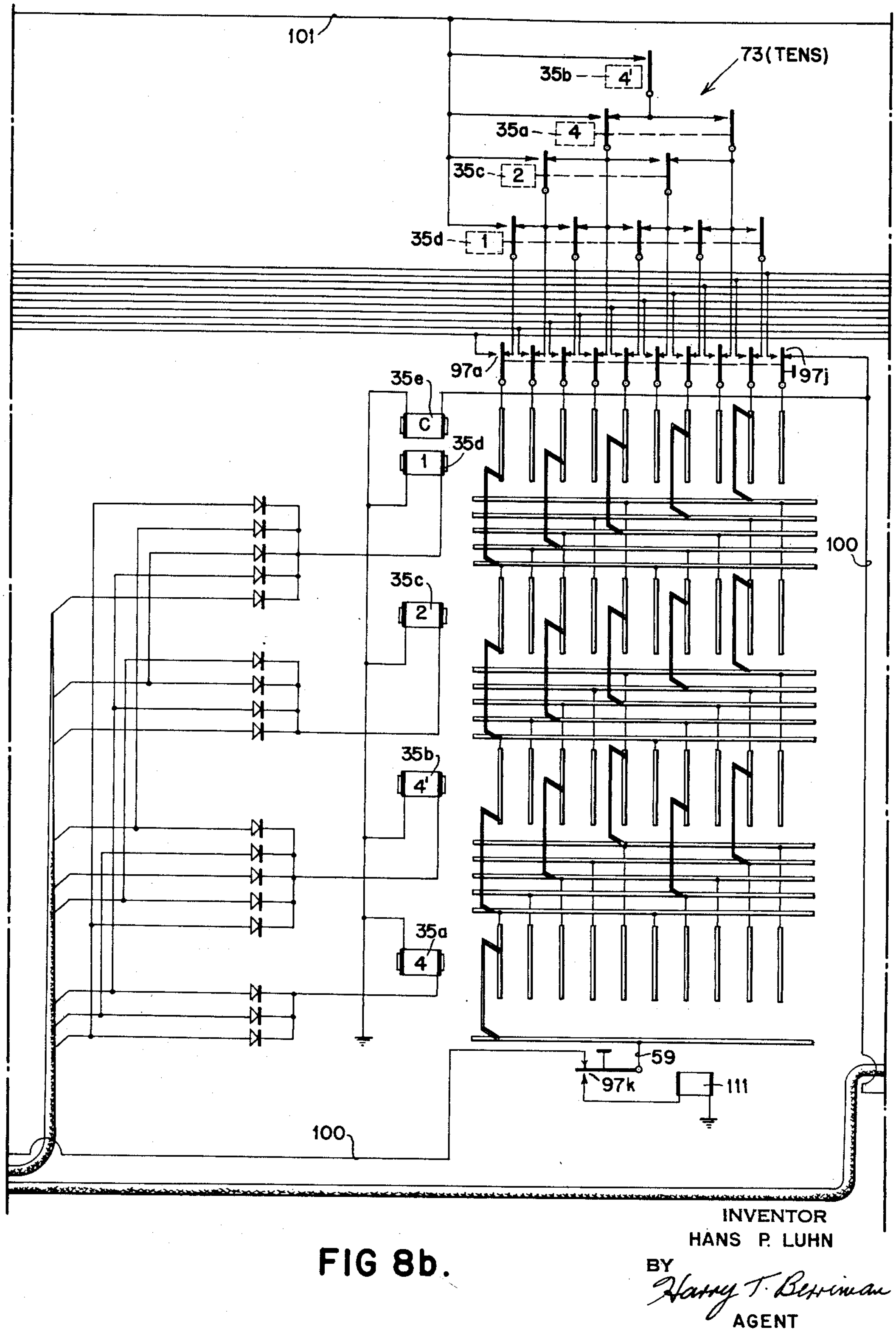
Figures 8C, 9:
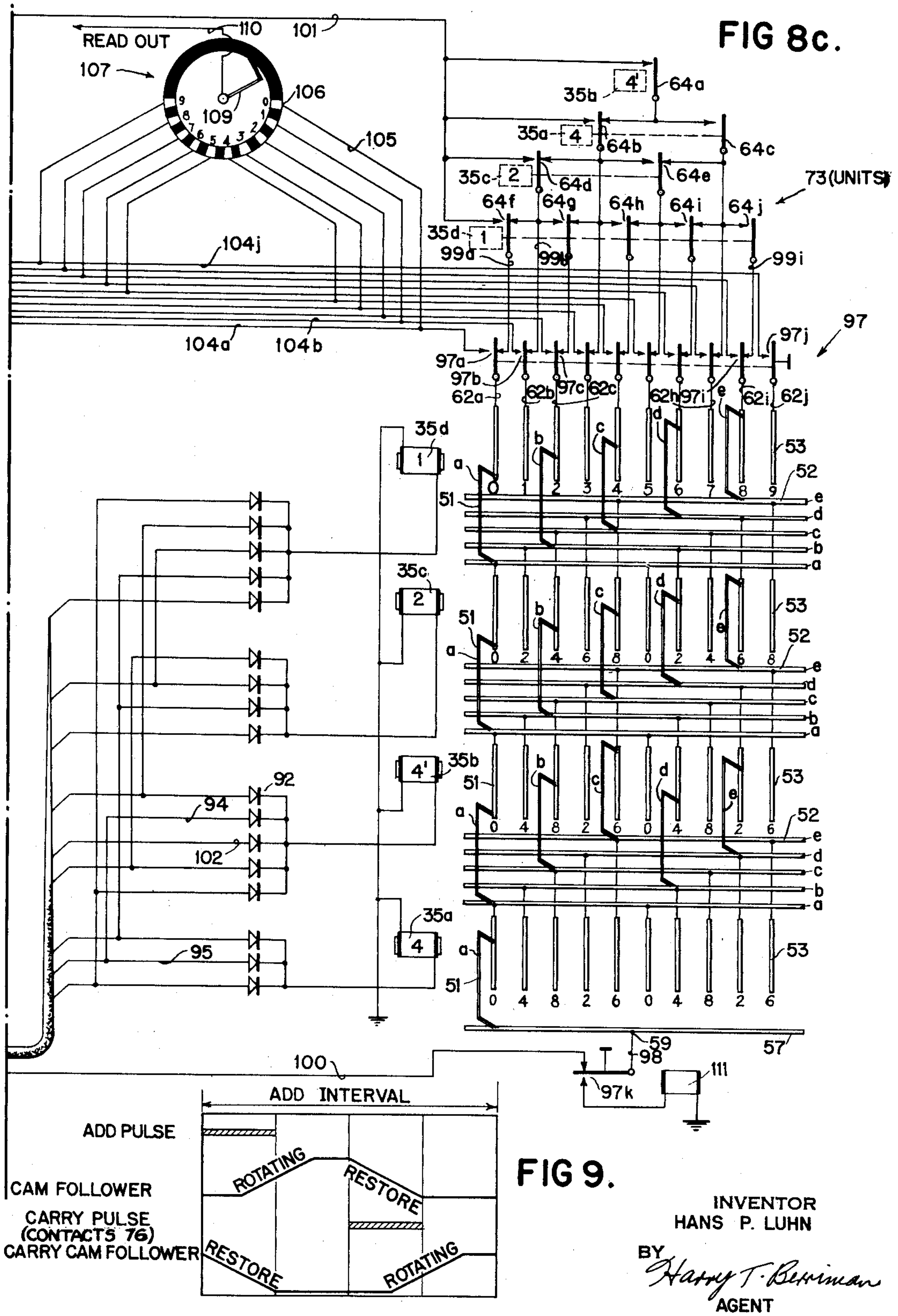

Figs. 8*a*, 8*b* and 8*c* comprise a wiring diagram of a three order accumulating machine.

Fig. 9 is an electrical-mechanical timing chart.

Figures 1, 10:
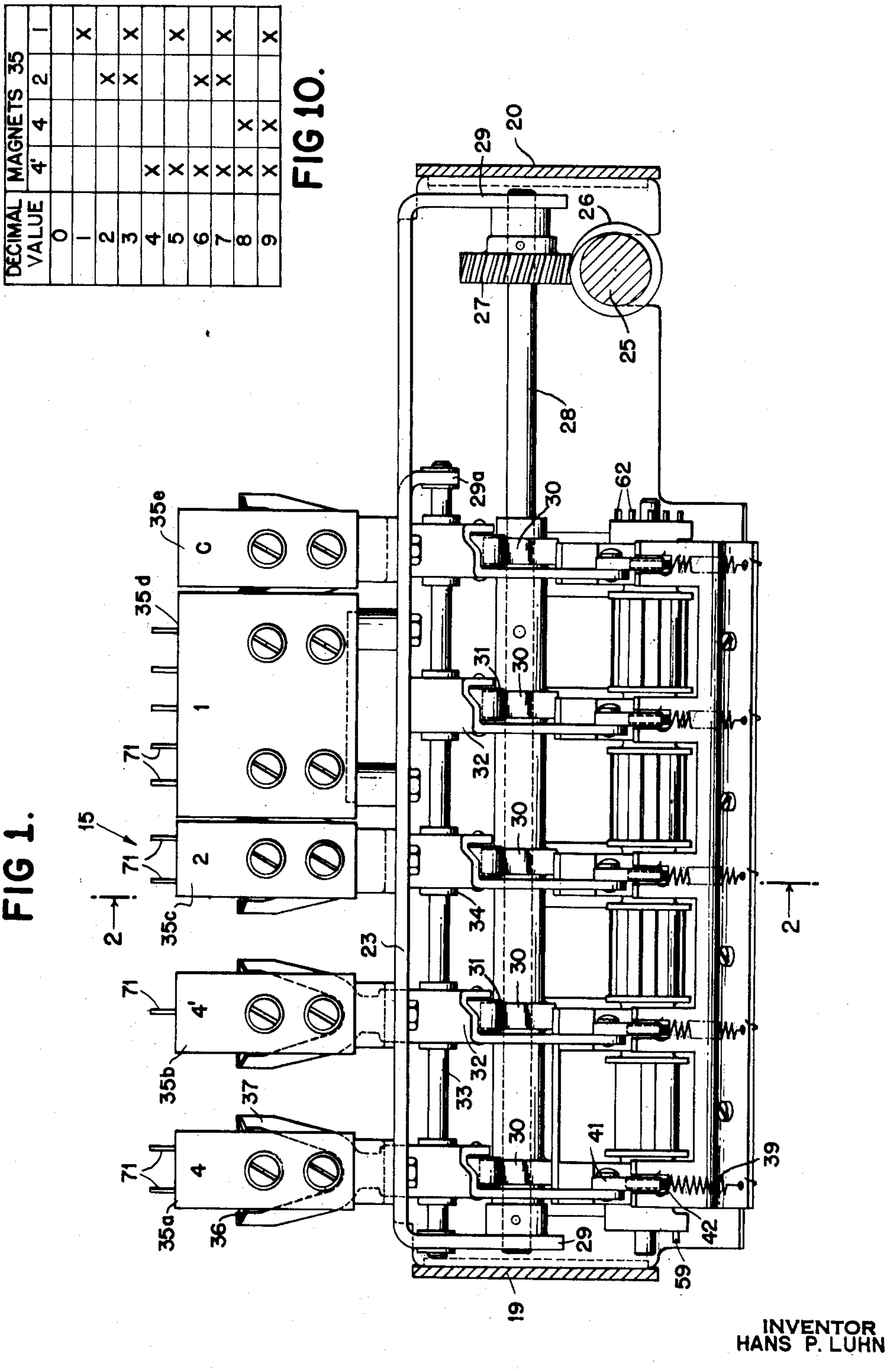

Fig. 10 is a code translating table.

Figure 2:
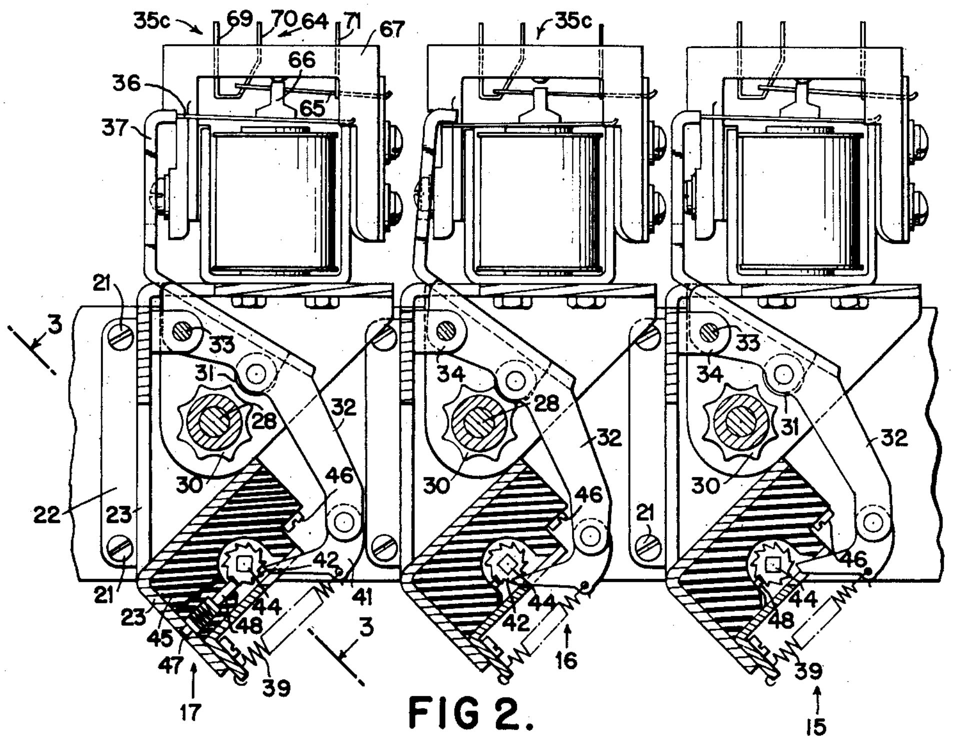
Figure 3:
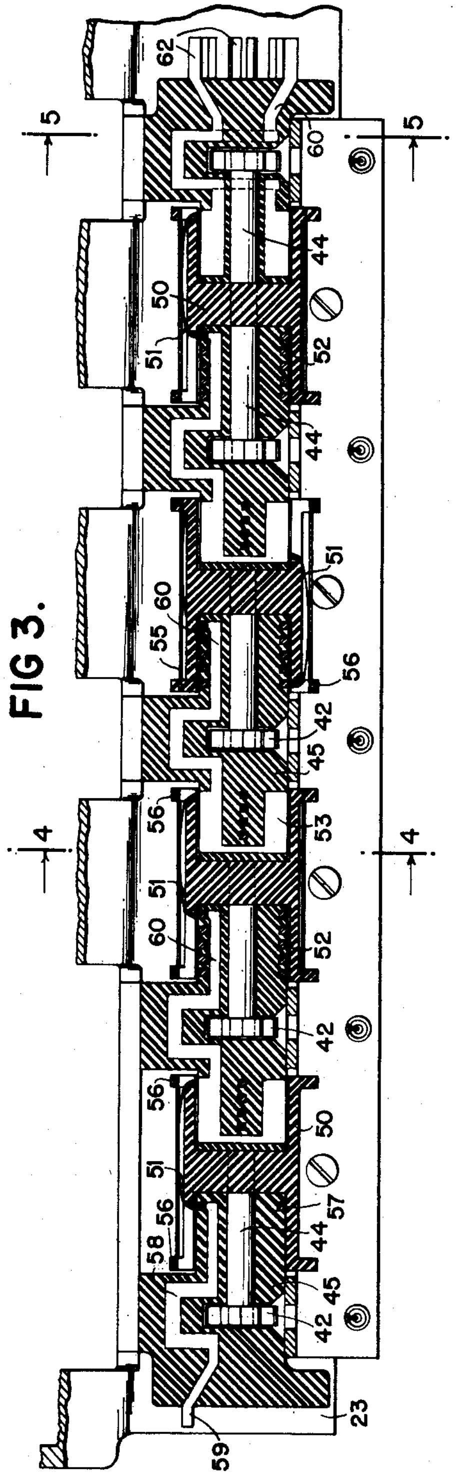
Fig. 3 is a section view taken through the hundreds order counter unit on the plane of the line 3—3 of Fig. 2.

Referring to Figs. 1, 2 and 3, there is shown an assembly of three identical counter units, a units order counter unit, generally designated 15, a tens order counter unit, generally designated 16, and a hundreds order counter unit, generally designated 17. The three counter units are aligned with each other as indicated, each being secured to stationary plates 19 and 20 by screws 21 through end flanges 22 of a related frame member 23. Extending through an opening in the frame 23 of each of the counters is a common drive shaft 25 which is rotatably supported near its ends in any suitable manner (not shown). The shaft 25 carries three worm gears, such as 26 in Fig. 1, each of which meshes a gear 27 secured to a shaft 28 of the related counter. Each shaft 28 is rotatably supported at its ends in flanges 29 of the corresponding frame 23. The shaft 25 is continuously rotated by any suitable means (not shown) thus effecting a continuous rotation of the shafts 28.

Secured to each of the shafts 28 at spaced intervals, as indicated in Fig. 1, are five multi-lobed cams 30. Each cam is adapted for cooperation with a roller 31 carried by a related cam follower 32. The five cam followers for each counter are pivotally mounted on a stationary shaft 33 which is secured at its ends to the flanges 29 and 29A of the frame 23, and also supported at spaced intervals therebetween by extending tabs 34 of the frame.

Each of the cam followers is controlled by an associated electromagnet 35*a* to *e* attached to the frame. The armature 36 of each magnet serves as an interposer adapted for cooperation with an extension 37 of the related cam follower. A spring 39 connected between a bracket 40 secured to the frame 23 and a pawl 41 pivoted on the lower end of the cam follower, normally biases the follower in a direction to engage the associated roller 31 with its cam. However, when the magnet is deenergized, the end of the armature engages the extension 37 of the cam follower thus maintaining the follower in a position with its roller free of engagement with the cam, as indicated for the hundreds order counter 17 (left hand unit) in Fig. 2.

Upon energization of one of the magnets 35, the associated armature is moved out of engagement with the extension 37 of the related cam follower, thus permitting the follower to be rotated about the shaft 34 until the roller 31 engages the related cam 30, as indicated for the tens order counter 16 (mid unit) in Fig. 2. As the cam follower rotates into the above described position, the nose of the associated pawl 41 engages a related ten tooth ratchet wheel 42 to advance it one tooth position. The ratchet wheel is attached to one end of a related shaft 44 which is journaled in an associated moulding 45 formed of an insulating material, the moulding being secured to the frame by fastenings 46 and by dowel stud 47 as indicated in Fig. 2. The follower is positively returned to a position to be relatched by the armature of the deenergized magnet, by the engagement of a high point of the cam 30 with the related roller 31. A spring biased detent 48 engaging the ratchet 42 as indicated in Fig. 2, prevents the restoration movement of the pawl 41 from rotating the ratchet wheel counterclockwise.

Secured to the other end of each of the shafts 44 for rotation therewith is a bobbin-like structure 50 (see Fig. 3) which is formed of a nonconductive material. It will be noted that the bobbin at the extreme right in Fig. 3 is common to two of the shafts 44. As a result, this bobbin may be advanced by the action of either of the two associated control magnets 35*d* or 35*e*.

Figure 4:
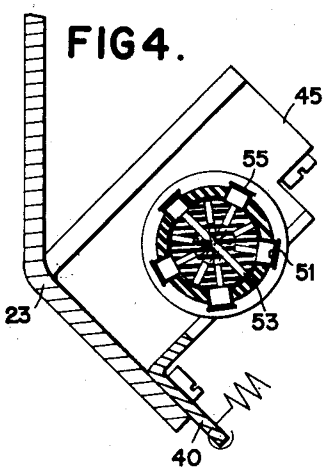
Fig. 4 is a section view taken on the plane of the line 4—4 of Fig. 3.
Figure 6:
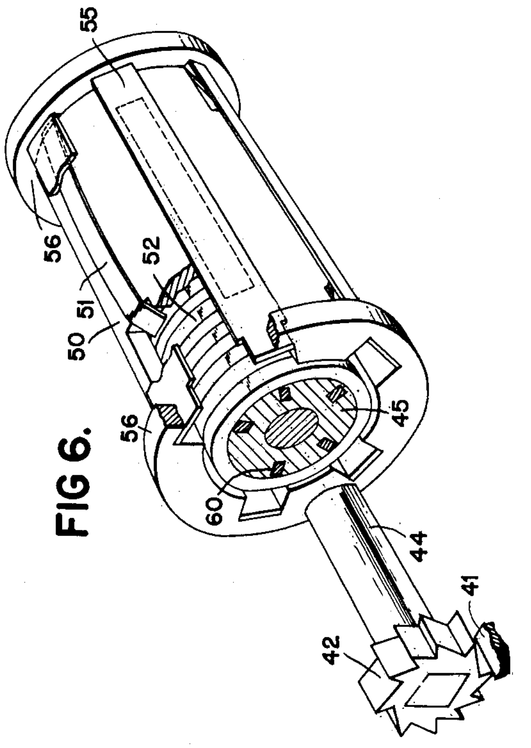
Fig. 6 is an enlarged perspective view of the bobbin structure comprising part of one of the rotary switching mechanisms of the counter unit.
Figure 7:
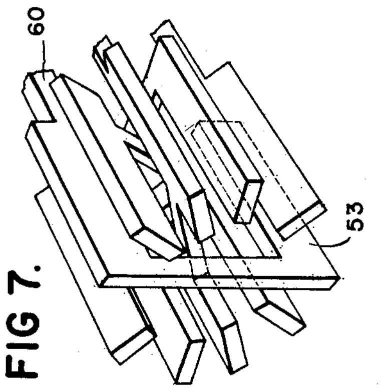
Fig. 7 is an enlarged perspective view of the contact strip structure comprising part of one of the rotary switching mechanisms of the counter unit.

Axially disposed around the circumferential surface of each of the bobbins, except the extreme left hand bobbin in Fig. 3, are five spaced spring contacts 51, as shown in Figs. 3, 4, and 6. The left end of each of the spring contacts projects inwardly through an opening in the related bobbin 50 (Figs. 3 and 6) and is adapted to electrically engage an associated contact ring 52 embedded in the adjacent moulding 45. Similarly, the right end of each of the spring contacts projects inwardly through a related opening in the bobbin and is adapted to electrically engage, dependent upon its angular position, one of a group of axially disposed contact strips 53 which are embedded in the next adjoining moulding 45, as indicated in Figs. 3, 4 and 7. A strip member 55 arranged adjacent the outer side of each of the spring contacts 51 and having its end portions engaging suitable openings in the rims 56 of that bobbin, serves to maintain each spring contact 51 fixed to the related bobbin. The extreme left hand bobbin in Fig. 3 differs from the others in that it carries only one spring contact 51, the left end of which is adapted to contact a related single contact ring 57 in the corresponding moulding 45. A contact strip 58 also embedded in the related moulding 45, is electrically secured to this ring and includes an end portion 59 extending outwardly beyond the moulding, as indicated, in order that a circuit connection may be made thereto.

Referring to Figs. 4 and 7, it will be noted that although there are ten contact strips 53 in each group, the diametrically opposite contact strips are actually a common member which has an extending portion 60 making continuous contact with one of the contact rings 52 to the right thereof. As a result, each contact strip 53 is adapted to be contacted by each related spring contact 51 at two points in each complete rotation of the latter. Each single tooth advance of a ratchet wheel 42 displaces the associated bobbin and spring contacts correspondingly to electrically connect each contact ring 52 associated with that bobbin to the next successive contact ring 52 of the next bobbin to the right.

Figure 5:
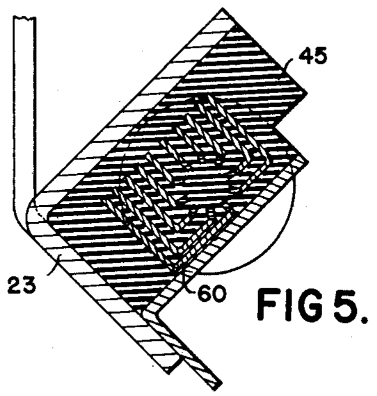
Fig. 5 is a section view taken on the plane of the line 5—5 of Fig. 3.

The group of contact strips at the extreme right in Fig. 3 differs from the other groups in that there are actually ten electrically distinct contact strips, as indicated in Fig. 5, each having an end portion 62 extending through the related moulding 45 in order that a circuit connection may be made thereto. By this construction, each of these contact strips is adapted to be contacted by each of the related spring contacts 51 at only one point in each complete rotation of the latter.

It will be appreciated that by the above described construction each counter, in effect, comprises four serially arranged rotary selector or switching mechanisms each of which may be advanced one position or step by the energization of its related control magnet 35. The control magnets of each counter are selectively operated in accordance with a substantially binary coding of decimal digits. In this case a 4, 4′, 2, 1 code is used and each control magnet 35 is accordingly assigned a corresponding value preceding from the left to the right, as indicated in Fig. 1. For example, to enter the value "7" into a counter, magnets 35*b*, *c* and *d* thereof are simultaneously energized in a manner to be later explained. The resultant single step advance of the related bobbins 50 modifies the serial circuit over the four switching mechanisms so as to form a closed connection between the terminal 59 and a specific terminal 62*g* which is indicative of the numeral "7". Other values may be successively entered into the counter in the same manner, resulting in further rotation of the related switching elements which indicate in each case the resulting new total. Fig. 10 shows the particular magnets 35 of a counter which are impulsed singly or in combination to enter any digit 1 to 9 into a counter. A decimal carry is entered into each counter, when required, by the energization of the associated extreme right hand magnet 35*e* in Fig. 1. It will be remembered that the extreme right hand bobbin in Figs. 1 and 3 is common to two ratchet wheels 42. The left hand wheel of these two is controlled by the magnet 35*d*, and the other wheel is controlled by the "carry" magnet 35*e*. Thus, a "1" may be entered into the counter by the energization of either magnet 35*d* or 35*e*.

Referring to Fig. 2, it will be noted that each control magnet 35*a* to *d* of the counter, in addition to its previously described functions, is adapted to control a related single pole-double throw switch 64 or a plurality of such switches as the case may be. The transfer member 65 of these switches extend through suitable openings in an insulating member 66 secured to the related armature 36. An insulating member 67 forming part of the magnet frame structure has embedded therein stationary contacts 69, 70 and 71 for each transfer member; the transfer member extending through and continually engaging the contact 71 while its end is disposed between the contacts 69 and 70 as indicated. When the magnet 35 is unenergized, as indicated for the hundreds order counter 17 in Fig. 2, a closed circuit extends from the associated contact 70, through the transfer member 65 to the contact 71. With the magnet energized, as indicated for the tens order counter 16 in Fig. 2, a circuit extends from the associated contact 69, through the transfer member 65 to the contact 71. The magnet 35*b* of each counter unit controls one switch 64*a* of the type described, the magnet 35*a* controls two switches 64*b* and *c*, the magnet 35*c* controls two switches 64*d* and *e* and the magnet 35*d* controls five switches 64*f* to *j*.

These switches of each counter are interconnected in such a manner so as to form a separate labyrinth circuit 73 for each counter as indicated in Figs. 8*a*, 8*b* and 8*c*. Each time a new value is entered into a counter, the related labyrinth circuit 73 through its transferred switches 64 is representative of this value (addend), while the actual counter itself is representative of the new total. In order to determine if a carry should be effected from that counter into the next higher order counter, an electrical comparison is effected between the labyrinth circuit 73 and the actual counter circuit itself in accordance with the following rule: If the new total in the counter is equal to or greater than the addend, there is no carry to the next counter; if the new total is less than the addend, there is a carry; if the new total is equal to 9, there is a carry on a carry or in other words there is a carry to the next higher order counter device only if there is a carry into that counter from the next lower order counter.

*Circuits*

Referring to Figs. 8*a*, 8*b* and 8*c*, there is shown in diagrammatic form a complete three order, cyclically operable accumulating machine which utilizes the previously described counter assembly and includes means for entering numbers into the machine and means for reading the accumulated total out of the machine when desired. Each of the contacts 75 and 76 shown in Fig. 8*a* is closed during a definite time interval of each cycle of the machine by a related cam which is operatively connected to the main power shaft 25 by suitable mechanism (not shown).

The entry of each decimal number into the accumulator is effected through the medium of a perforated record as indicated in Fig. 8*a*. Each record 77 is provided with parallel columns of uniformly spaced index points numbered 1 to 9. Each order of the number to be entered into the accumulator is represented in the record by a perforation in the corresponding index point of the desired column. A record card is advanced each machine cycle into a stationary sense position between a plate 79 and a plate 80 by any suitable mechanism (not shown). The plate 79 is formed of a conductive material for a purpose that will be later evident.

Arranged above each column of a record card when in the stationary sense position, is a line of conductor sensing pins 81, one pin for each index point of the record column. Each sense pin 81 is reciprocably guided at its lower end in a mating opening in the plate 80 and is similarly guided at its upper end by a mating opening in a plate 82. The plates 80 and 82 are formed of an insulating material so that each sense pin 81 is electrically insulated from the remaining pins. A spring 84 surrounding each sense pin and acting between an integral shoulder thereof and the undersurface of the plate 82, biases the pin downward relative to the plate 82 so as to normally maintain a shouldered portion at the upper end of the pin in engagement with the upper surface of the plate 82. The plate 82 is normally maintained a sufficient distance above the plate 80 so that the lower ends of the pins 81 are above the undersurface of the plate 80, and thus clear of the movement path of a record between the plates 79 and 80.

To effect a sense operation, the plate 82 is shifted towards the plate 80 by any suitable mechanism (not shown). The pins 81, by the action of their related springs 84, follow this downward movement of the plate 82, and, as a result, engage their lower ends with the related index areas of the record in the sense position. Those pins which find perforated areas in the record engage the conductive plate 79 while those pins which engage non-perforated areas are insulated from the plate by the record. Thereafter, the closing of the cam contact 75 completes a circuit from a positive power line 85, through the cam contact, the conductive plate 79, each of the pins 81 contacting the plate, and then through an individual circuit conductor 86 connected to the upper end of each sense pin.

Electrically connected to the nine individual conductors 86*a* to *i* for each column of sensing pins is a network, generally designated 87, for translating from the 1 to 9 decimal card code to the required 4, 4′, 2, 1 operational code of the associated counter. Thus, the sensing of a 9 perforation in a particular column, for example, completes a circuit from the power line 85, through the cam contact 75, the conductive plate 79, the related sense pin 81, the conductor 86*i*, the conductors 89, 90 and 91 and their series connected rectifiers 92, the control magnets 35*d*, *b* and *a*, respectively, of the associated counter, and finally to ground. The sensing of a perforation at other index points effects the energization of the required control magnets of the associated counter in a similar manner as indicated in Fig. 10. The rectifiers 92 serve only as isolating means between the various input circuits to each control magnet 35.

In order to facilitate understanding of the accumulating machine, a simple accumulate operation including read in and read out operations will be explained. It will be noted in Figs. 8*a*, 8*b* and 8*c* that the numerical significance of each of the contact strips 53 of each of the four switch mechanisms of the units order counter is indicated by a numeral under the strip. Also the contact rings 52 of each of the four switch mechanisms of the units counter have been further labeled *a* to *e*, and the spring contacts 51 of each switch of the units counter have been further labeled *a* to *e*. These latter designations are for reference purposes only.

Assume that the decimal numbers 8 and 4 are to be accumulated to give a total of 12 and that prior to this accumulate operation the units, tens, and hundreds order counters are positioned at their zero positions as indicated in Figs. 8*c*, 8*b* and 8*a*, respectively.

*First machine cycle*

During the first machine cycle, a record card having an "8" perforation in the units column of the record is positioned in the sense position. Thereafter, the plate 82 is shifted towards the stationary record card. As a result, the "8" sense pin 81 of the units column sense pins engages the conductive plate 79 through the aligned "8" perforation in the record. With the "8" pin engaging the plate, the closing of the cam contact 75 during the first quarter of a so-called add interval of the machine cycle (see Fig. 9), completes a circuit from the power line 85, through the cam contact 75, the "8" pin 81, the conductor **86*h*, the conductors 94 and 95 and their series connected rectifiers 92, the control magnets 35*a* and *b*** of the units counter and then to ground.

As a result of the energization of the above control magnets of the units counter, the associated cam followers 32 are rotated, as indicated in Fig. 9, to effect a simultaneous single step advance of the corresponding bobbins 50 and their associated contact springs 51. The energization of the control magnets **35*a* and *b* of the units counter also effects a transfer of the related switches 64*a*, *b* and *c* in the units order labyrinth circuit 73**.

At approximately the end of the second quarter of the counter add interval, a circuit is available from a transfer element of contacts **97*k* of a related multi-contact switch 97, through a conductor 98, the terminal 59, the contact ring 57 of the switch 35*a* of the units counter, the related spring contact 51*a*, which is now engaging a contact strip 53(4) of switch 35*a*, through the contact ring 52*b* of switch 35*b*, the associated spring contact 51*d* of switch 35*b*, which is now engaging a contact strip 53(8) of switch 35*b*, through the contact ring 52*c* of switch 35*c*, the spring contact 51*c* of switch 35c, the contact strip 53(8) of switch 35*c*, the contact ring 52*e* of switch 35*d*, the spring contact 51*e* of switch 35*d*, the contact strip 53(8) of switch 35*d*, through the connector 62*i* to a related transfer element of contacts 97*i* of the multi-contact switch 97**. Although this circuit is not utilized at this time, it indicates that an "8" is now registered in the units counter.

It will be noted in Figs. 8*a*, 8*b* and 8*c* that each of the terminals **62*a* to *j* of each counter are electrically connected to a transfer element of contacts 97*a* to *j* of the previously mentioned multi-contact switch 97. Each of the transfer elements of contacts 97*a* to *i* when in the position indicated is connected to a related output line 99*a* to *i* of the related labyrinth circuit 73. The transfer element of the contacts 97*j* of the hundreds order counter is normally connected through a "carry" conductor 100 and the transfer element of the contacts 97*k* of the tens order multi-contact switch 97 to the connector 59 of the tens order counter. In a similar manner, the transfer element of the contacts 97*j* of the tens order counter is connected to the units counter terminal 59. The transfer element of the contacts 97*j*** of the units contact is normally disconnected from any circuit as indicated.

During the third quarter of the so-called add interval of the machine cycle, the cam contacts 76 close to complete a circuit from the power source 85, through the contacts 76 (see Fig. 9) and the conductor 101 to the units, tens, and hundreds order labyrinth circuits 73. By examination of the labyrinth circuit 73 for each order, it will be evident that if the total in the related counter is less than the addend which is represented in the corresponding labyrinth circuit, the closing of the contacts 76 completes a circuit through that labyrinth circuit, the related counter circuit itself to the associated terminal 59, the related contacts **97*k*, the associated conductor 100, and finally through the carry magnet 35*e* of the next higher order counter. In our particular example, however, the units labyrinth circuit 73 and the units add device are both representative of eight so that no circuit to the tens order carry magnet 35*e*** is available.

*Second machine cycle*

During the second machine cycle, a record card having a "4" perforation in the desired column is positioned in the sense position. Thereafter, during the first quarter of the add interval of the second machine cycle, the "4" card is sensed. As a result thereof, a circuit extends from the power source 85, through the cam contacts 75, the related "4" sense pin 81, the conductor 102 and its serially connected rectifier 92, the control magnet **35*b* of the units counter, and then to ground. As a result of the energization of this control magnet, the associated cam follower 32 is displaced to effect an additional single step advance of the corresponding bobbin 50 and its associated spring contacts 51. The energization of the magnet 35*b* also transfers the related switch 64*a* in the units order labyrinth circuit 73**, this circuit then being representative of the addend "4".

At the end of the second quarter of the add interval, a circuit is available from the transfer element of the contacts 97 of the units order counter through the associated connector 98, the contact ring 57 of the switch **25*a* of the units counter, the related spring contact 51*a*, which is still engaging a contact strip 53(4) of switch 35*a*, through the contact strip, the contact ring 52*b* of switch 35*b*, the associated spring contact 51*d* of switch 35*b* which is now engaging a contact strip 53(2) of switch 35*b*, through the contact strip, the contact ring 52*d* of the switch 35*c*, the spring contact 51*d* of switch 35*c*, the contact ring 52*b* of switch 35*c*, the associated spring contact 51*b* to the contact strip 53(2) of the switch 35*d*, through the associated terminal 62*c* to the associated transfer element of the contacts 97*c***. Although this circuit is not utilized at this particular time, it indicates that a "2" is now registered in the units counter.

Since the new total "2" represented in the units counter is less than the addend "4" represented in the associated labyrinth circuit 73, a carry is effected to the tens order counter as follows: The closing of the carry contact 76 during the third quarter of the add interval completes a circuit from the power line 85, through the contact 76, the connector 101, the normally open side of the switch **64*a* of the units order counter, now closed, the normally closed side of the related switch 64*b*, the normally closed side of the related switch 64*g*, through the normally closed side of contacts 97*c* of the multi-contact switch 97, through the circuit previously traced of the units counter, the terminal 59, the normally closed side of contacts 97*k* of the multi-contact switch, the conductor 100, and then through the carry magnet 35*e* the tens order counter to ground. The resultant energization of the carry magnet effects a single step advance of the associated switch mechanism of the tens order counter during the fourth quarter of that add interval. Thus, at the end of the fourth quarter of the add interval, a circuit is also available from the contacts 97*k* of the tens order counter through the counter to the transfer point of the contacts 97*b*** of the counter. This circuit indicates that a "1" is registered in the tens order counter.

It will be noted in Fig. 9 that the movement of the cam follower 32 of the carry magnet in effecting the entry of a one into the tens order counter, takes place during the time that the previously operated cam followers of the units order counter are being restored. Consequently, the carry operation is effected without appreciably lengthening the add interval of the machine cycle. At the end of the add interval of the second machine cycle, the tens order counter has a "1" registered therein while the units order counter has a "2" registered therein. Thus the desired total of "12" is now registered in the accumulating machine.

Readout of the total in the accumulating machine may then be effected as follows: Referring to Figs. 8*a*, 8*b* and 8*c*, it will be noted that the normally open side of each of the contacts **97*a* to *j* of the particular multi-contact switch 97 associated with each counter is connected to a related common readout conductor 104*a* to *j*, respectively. Each of these conductors in turn is connected by an associated conductor 105 to a related segment 106 of an emitter 107. A common brush 109 of the emitter is electrically connected to the power source 85 by a conductor 110. The brush is operatively linked to the power shaft 25 by suitable mechanism (not shown) and is adapted to sweep over the inner surfaces of the segments 106 to connect each of the readout conductors 104 successively to the power source 85. Connected between ground and the normally open side of the contacts 97***k* of each switch 97 is an electromagnet 111 which controls the setting of an associated print device. Each print device may comprise a well known reciprocable type bar (see patent to G. F. Daly, No. 1,921,454) having the numerals 0 to 9 sequentially arranged therein. The type bar is operatively linked to the power shaft 25 in any suitable manner and is adapted to move its type elements successively past a printing line in synchronism with the engagement of the brush 109 with successive segments of the emitter.

Parallel readout of all orders of the counter is effected by simultaneously transferring by hand or in any suitable manner all of the contacts 97*a* to *k* of the switch 97 associated with each counter. This action disconnects each counter from its related labyrinth circuit 73 and connects it to the readout lines 104. Dependent upon the number registered in each counter, a circuit is completed at a particular time in the readout cycle, from the power line 85 through the common brush 109, through one of the segments 106, the related conductor 105, the associated conductor 104*a* to *j*, the related contacts 97*a* to *j* of the switch 97 associated with that particular counter, the associated terminal 62*a* to *j*, the corresponding contact strip 53 of the switch 35*d* of that counter, through the counter itself to the terminal 59, the normally open side of the associated contacts 97*k*, now closed, the related print control magnet 111, and finally to ground. Each magnet 111 is, therefore, subjected to a differentially timed pulse during the readout cycle as determined by which number is registered in the related counter. The differentially timed pulse applied to each control magnet 111 arrests the movement of the related type bar with the required type numeral opposite the printing line, in a manner well known to those acquainted with the art and as explained in detail in the above mentioned patent. Thereafter, printing is effected by forcing the type bars against a suitable inking medium and a backing record sheet.

While there have been shown and described and pointed out the fundamental novel features of the invention as applied to a preferred embodiment, it will be understood that various omissions and substitutions and changes in the form and details of the apparatus illustrated and its operation may be made by those skilled in the art, without departing from the spirit of the invention. It is the intention, therefore, to be limited only as indicated by the scope of the following claims.

What is claimed is:

1. An electro mechanical accumulating device comprising, in combination, a number of rotary selector devices separately advanceable step by step, said devices being electrically interconnected so as to form a labyrinth circuit having a common input line and a number of output lines each representative of a particular sum digit, an impulse responsive device associated with each of said selectors and adapted to effect a single step advance thereof for each impulse received, said advance effecting an adjustment of said labyrinth circuit, and means for selectively impulsing said devices singly or in combination as determined by the value of a desired entry digit wherein said labyrinth circuit is accordingly adjusted so as to connect said common input line to one of said output lines representative of the new sum digit.

2. A denominational order of a counter comprising, in combination, four rotary selector devices each assigned a weighted value in accordance with a 4, 4′, 2, 1 code, a magnet controlled mechanism for each of said selectors and adapted to advance the selector step by step to represent the units digit of succeeding multiples of the assigned weighted value, circuit means connecting said selectors in series, said circuit including ten output lines each representative of one of the digits with only one of said lines being selected at any one time as determined by the setting of said selectors, and means for selectively impulsing said magnets singly or in combination as required by the value of an addend value wherein the single step advance of the associated selectors adjusts said circuit so as to select the output line representative of the sum of said original circuit setting and said addend value.

3. A denominational order of an accumulator comprising, in combination, a plurality of multi-position rotary selectors, each assigned a weighted decimal value in accordance with a predetermined code and adapted to switch one or more circuits at each successive position, mechanism including a control magnet associated with each of said selectors for advancing it position by position, circuit means interconnecting the various switch points of said selectors and terminating in a plurality of output lines of which only one is selected at any one time as determined by the position of said selectors, and record controlled means for selectively energizing said control magnets singly or in combination to advance said related selectors and select a particular one of said output lines.

4. In an accumulator unit, a series of rotary selectors, said selectors being electrically interconnected so as to form a labyrinth circuit having a common input line and a number of output lines, actuating mechanism for advancing each of said selectors in step-by-step fashion comprising a ratchet wheel operatively connected to a rotatable member of said selector in driving relationship, an operating lever pivoted for swinging movement about an axis parallel to the axis of rotation of said ratchet wheel, a pawl pivotally secured to one end of said lever, said operating lever being movable in an operational direction wherein said pawl in cooperation with said ratchet wheel advances the latter one step and movable in a restoring direction to move said pawl idly in a direction preparatory to the advance of the ratchet wheel, means yieldably biasing said lever in said operational direction, a magnet, armature means attracted by said magnet and adapted when in an unattracted position to latch said lever in said restored position against the action of said yieldable means, cam means for moving said lever to said restored position; and means for selectively impulsing said control magnets singly in combination wherein said labyrinth circuit is accordingly adjusted so as to connect said common input line to one of said output lines.

5. A denominational order of an accumulator comprising, in combination, a labyrinth network having a plurality of output lines each representative of one of the decimal digits, four multi-position rotary selectors arranged in series in said network, said selectors being adapted to be advanced singly or in combination, position by position, to adjust said network and select one of said output lines, each of said selectors being assigned a weighted decimal value in accordance with a 4, 2′, 2, 1 code; a ratchet wheel for each of said 4, 2′, and 2 selectors and having a driving connection therewith, a pair of ratchet wheels for said 1 selector, each wheel of said pair having a separate driving relationship with said selector; a pawl for each of said ratchet wheels, yieldable means continuously biasing each of said pawls towards operational engagement with said related wheel to effect a single position advance of that selector, a latch device normally latching each of said pawls in a position free of engagement with said related ratchet wheel against the action of said yieldable means, a magnet associated with each of said latches for the release thereof when energized, cam means for restoring each of said released pawls to a latched position after a single position advance of the related selector, means for selectively energizing said 4, 2′, 2 selector magnets and the first of said pair of magnets of the 1 selector, singly or in combination as required by a desired entry value wherein the network is accordingly adjusted, and means for later energizing the second of said pair of magnets of the 1 selector, when required, wherein said network is further adjusted to include a carry requirement.

6. The mechanism of claim 5 further characterized in that the operational movement of said pawl during the carry operation takes place during the restoration movement of any previously released pawls so that the carry operation does not lengthen the add cycle.

7. An accumulating unit comprising, in combination, a series of rotary selectors, each of said selectors comprising a plurality of stationary switch contacts disposed in a predetermined path, at least one movable contactor adapted to be moved step by step along said path to successively engage each of said contacts, a stationary contact element continuously engaged by each and only one of said contactors during said entire movement path, circuit means connecting each of said fixed contacts of a selector to one of said stationary contact elements of the succeeding rotary selector, a common input line connected to a single said stationary contact element of a first of said series of selectors, an output line connected to each of said fixed contacts of a last of said series of selectors, and means for simultaneously effecting a single step advance of said selectors singly or in combination wherein a single circuit is rendered available between said input line and one of said output lines.

8. An electro-mechanical counter comprising, in combination, a series of rotary selectors, each of said selectors comprising a rotatable bobbin structure formed of an insulating material, one or a plurality of elongated spring contacts carried by said bobbin, a first end of said contacts being staggered from its fellows if that bobbin has plural contacts, a conductive ring for each contact of a selector and arranged so as to be continuously engaged by said first end of said contact during rotation of said bobbin, a plurality of radially arranged contact strips adjacent the other end of said spring contacts and adapted to be successively engaged by a second end of each of said contacts during rotation of said bobbin, conductive means interconnecting each of said contact strips of a selector to a particular contact ring of the succeeding selector, a control magnet associated with each of said selectors and adapted to effect an incremental rotation of said bobbin for each impulse received wherein each of said associated contacts is engaged with a succeeding contact strip, a single input line to a single contact ring of a first of said series of selectors, an output line connected to each of said contact strips of a last one of said series of selector mechanisms, and means for simultaneously energizing said control magnets as determined by the value of an entry digit wherein a circuit is rendered available from said common input line to one of said output lines representative of the sum of said entry value and the value previously represented in said selectors.

9. A denominational order of an accumulator comprising, in combination, a series of rotatable bobbins each assigned a weighted value in accordance with a predetermined code, an elongated wiper carried by the first bobbin of said series for rotation therewith, a fixed contact member continuously engaged by one end of said wiper during rotation thereof, a plurality of elongated wipers spaced around the periphery of each of the remaining bobbins of said series for movement therewith, said wipers of each of said drum being displaced longitudinally relative to each other, a plurality of fixed contact members one for each of said wipers of a bobbin and continuously engaged by one end thereof during rotation of the wiper, a series of fixed contacts positioned in the path of movement of said wiper or wipers of each bobbin and adapted to be successively engaged thereby as the drum is rotated, circuit means connecting each of said series of fixed contacts of a bobbin to one of said fixed contact members of the succeeding bobbin, separate means associated with each of said bobbins for effecting advance thereof step by step, means for selectively actuating said bobbin advancing means singly or in combination as determined by a desired entry digit, wherein the single step advance of the related bobbins completes a circuit from the fixed contact member of the first of said series of bobbins to one of said series of fixed contacts of the last of said bobbins.

10. A denominational order of an accumulator comprising, in combination, a series of multi-position rotary selectors each assigned a weighted value in accordance with a predetermined code, each of said selectors being adapted to switch one or a multitude of circuits at each successive position, magnet controlled mechanism associated with each of said selectors for advancing it position by position, circuit means interconnecting the various switch points of each selector to a succeeding selector so as to form a multitude of possible conductive paths therebetween, a plurality of output lines extending from a last of said series of selectors, one for each of the digits, a conductive path being completed through said series of selectors to one of said output lines as determined by the positions of said selectors, means for selectively energizing said selector advancing mechanisms singly or in combination as determined by the value of an addend digit wherein a conductive path is completed through said series of selectors to an output line representative of the sum of said entry digit and the prior setting of said selectors, transfer contacts associated with each of said selectors and closed briefly thereby on each advance of said selector, the transfer contacts of all of said selectors being arranged in a network settable to represent the addend value, and means acting through said network and the selected output line of said selectors when the sum digit is less than the addend value for initiating a tens carry operation in a succeeding order counter.

11. A denominational order of a counter comprising, in combination, a series of rotary selector devices separately advanceable step by step, said devices being electrically interconnected so as to form a first labyrinth circuit having a common input line and a number of output lines each representative of a particular sum digit, an impulse responsive device associated with each of said selectors and adapted to advance said selector a single step for each impulse received, each of said impulse devices being assigned a weighted decimal value in accordance with a predetermined code, means for selectively impulsing said devices singly or in combination as determined by the value of a desired addend value, wherein said labyrinth circuit is adjusted so as to connect said input line to one of said output lines representative of the new sum digit, transfer contacts associated with each of said impulse responsive devices and actuated thereby, said transfer contacts being interconnected to as to form a second labyrinth circuit settable to represent the addend value, means for effecting a comparison between said second and first labyrinth circuits, and means controlled by said comparison means for directing a carry impulse to one of said selectors of a succeeding higher order counter if the sum digit is less than the addend value.

12. A denominational order of a counter comprising, in combination, a series of rotary selector devices separately advanceable step by step, said devices being electrically interconnected so as to form a first labyrinth circuit having a common input line and ten output lines each representative of a particular sum digit 0 through 9, an impulse responsive device associated with each of said selectors and adapted to advance said selector a single step for each impulse received, each of said impulse devices being assigned a weighted decimal value in accordance with a predetermined code, means for selectively impulsing said impulse responsive devices singly or in combination as determined by the value of a desired addend value, wherein said first labyrinth circuit is adjusted so as to connect said input line to the particular output line representative of the new sum digit, transfer contacts associated with each of said impulse responsive devices and actuated thereby, said transfer contacts being interconnected so as to form a second labyrinth circuit having a single input line and a multitude of output lines, one for each of the digits, said second circuit being adjusted in accordance with the related contacts actuated so as to connect said related input line to the particular output line thereof corresponding to the addend value, circuit means connecting each of the 1 to 9 digit output lines of said second circuit to the 0 to 8 digit output lines, respectively, of said first circuit, a current responsive device connected in said common input line of said first circuit and adapted to represent by its energization that the sum value is less than the addend value, means for applying a current impulse to said input line of said second circuit, and means controlled by said current responsive device when energized for effecting a carry to a succeeding denominational order of the counter.

References Cited in the file of this patent

UNITED STATES PATENTS

| | | |
|---|---|---|
| 2,150,208 | Daly et al. | Mar. 14, 1939 |
| 2,243,474 | Bryce | May 27, 1941 |
| 2,424,100 | Lang | July 15, 1947 |